(12) United States Patent
Schenk et al.

(10) Patent No.: US 10,099,296 B2
(45) Date of Patent: Oct. 16, 2018

(54) DRILL CHUCK

(71) Applicant: Roehm GmbH, Sontheim/Brenz (DE)

(72) Inventors: Peter Schenk, Niederstotzingen (DE);
Patrick Hengsberger, Sontheim (DE)

(73) Assignee: Roehm GmbH, Sontheim/Brenz (DE)

( * ) Notice: Subject to any disclaimer, the term of this patent is extended or adjusted under 35 U.S.C. 154(b) by 77 days.

(21) Appl. No.: 15/045,677

(22) Filed: Feb. 17, 2016

(65) Prior Publication Data

US 2016/0236283 A1     Aug. 18, 2016

(30) Foreign Application Priority Data

Feb. 17, 2015   (DE) .................. 10 2015 102 241

(51) Int. Cl.
*B23B 31/12* (2006.01)
*B21K 1/30* (2006.01)
*B21D 51/16* (2006.01)

(52) U.S. Cl.
CPC ............. *B23B 31/123* (2013.01); *B21K 1/30* (2013.01); *B23B 31/1238* (2013.01); *B21D 51/16* (2013.01); *Y10T 279/17623* (2015.01); *Y10T 279/17632* (2015.01)

(58) Field of Classification Search
CPC ............. B23B 31/123; B23B 31/1238; Y10T 279/17615; Y10T 279/17623; Y10T 279/17632
See application file for complete search history.

(56) References Cited

U.S. PATENT DOCUMENTS

| 5,741,016 A | * | 4/1998 | Barton | .................. B23B 31/123 |
| | | | | 279/140 |
| 5,765,839 A | | 6/1998 | Röhm | |
| 5,957,469 A | * | 9/1999 | Miles | .................... B23B 31/123 |
| | | | | 279/140 |

(Continued)

FOREIGN PATENT DOCUMENTS

| DE | 198 00 998 A1 | 7/1999 | |
| DE | 29922011 U1 | * 2/2000 | ........... B23B 31/123 |

(Continued)

OTHER PUBLICATIONS

French Written Opinion and Search Report for French Application No. FR 16 50362 dated Mar. 27, 2018 with English translation.

*Primary Examiner* — Eric A Gates
(74) *Attorney, Agent, or Firm* — Muncy, Geissler, Olds & Lowe, P.C.

(57) ABSTRACT

A drill chuck having a chuck body connectable to a drilling spindle, in which are arranged clamping jaws in guide seats extending at an angle to the chuck axis, which are movable for opening and closing via a threaded ring that is arranged to be immovable relative to the chuck body. A locking device includes a coaxial ring of locking recesses as well as a locking element that is engaged in the locking recesses under the force of a locking spring. An adjusting ring rotatable to a limited extent between stops, the rotation of which adjusts the locking element. A detent device creating two detent positions in the circumferential direction. Attached to the axially forward section of the chuck body in a rotationally fixed and axially immovable manner is a locking sleeve that carries the ring of locking recesses and serves to axially secure the threaded ring.

8 Claims, 10 Drawing Sheets

(56) References Cited

U.S. PATENT DOCUMENTS

| | | | |
|---|---|---|---|
| 6,095,530 A | 8/2000 | Röhm | |
| 6,341,783 B1 * | 1/2002 | Rohm | B23B 31/123 |
| | | | 279/140 |
| 6,554,289 B1 * | 4/2003 | Lin | B23B 31/123 |
| | | | 279/140 |
| 6,902,172 B2 * | 6/2005 | Rohm | B23B 31/123 |
| | | | 279/62 |
| 7,431,308 B2 * | 10/2008 | Cachod | B23B 31/123 |
| | | | 279/125 |
| 7,896,356 B2 * | 3/2011 | Zhou | B23B 31/1238 |
| | | | 279/140 |
| 8,740,227 B2 * | 6/2014 | Zhou | B23B 31/123 |
| | | | 279/140 |
| 2017/0252832 A1 * | 9/2017 | Zhou | B23B 31/123 |

FOREIGN PATENT DOCUMENTS

| | | | | |
|---|---|---|---|---|
| EP | 0 710 518 A2 | 5/1996 | | |
| EP | 0 932 466 B1 | 1/2005 | | |
| FR | 2847181 A1 * | 5/2004 | | B23B 31/12 |
| JP | H 06-85972 B2 | 11/1994 | | |
| JP | 09262707 A * | 10/1997 | | |
| WO | WO 2007028287 A1 * | 3/2007 | | B23B 31/123 |

\* cited by examiner

DRILL CHUCK

This nonprovisional application claims priority under 35 U.S.C. § 119(a) to German Patent Application No. 10 2015 102 241.9, which was filed in Germany on Feb. 17, 2015, and which is herein incorporated by reference.

BACKGROUND OF THE INVENTION

Field of the Invention

The invention relates to a drill chuck having a chuck body that can be connected to a drilling spindle, in which body are arranged clamping jaws in guide seats extending at an angle to the chuck axis, which jaws are movable for opening and closing by means of a threaded ring that is arranged to be rotatable and axially immovable relative to the chuck body, having a locking device having a coaxial ring of locking recesses as well as at least one locking element that is engaged in the locking recesses under the force of a locking spring, having an adjusting ring that can be rotated to a limited extent between stops, the rotation of which adjusts the locking element, and having a detent device creating two detent positions in the circumferential direction.

Description of the Background Art

Drill chucks are known from EP 0 710 518 A2, which corresponds to U.S. Pat. No. 5,765,839, which is incorporated herein by reference, and which describes in particular the construction of the locking mechanism having the locking device and detent device, along with its manner of operation in the interaction of the individual components. Such drill chucks have proven superior in practice, and the applicant has also produced and sold variants in which the coaxial ring of locking recesses is formed on a thrust collar located between the threaded ring and the chuck body. Since the thrust collar has a thickness of only approximately 1 mm, the locking element is exposed to relatively high wear in these variants.

SUMMARY OF THE INVENTION

It is therefore an object of the invention to further improve a drill chuck, and in particular to reduce the manufacturing and assembly costs.

This object is attained in an embodiment according to the invention in a drill chuck in that the threaded ring is designed as an undivided threaded ring with an opening width that is larger than the diameter of the axially forward section of the chuck body, and that a locking sleeve that carries the ring of locking recesses and serves to axially secure the threaded ring is attached to the axially forward section of the chuck body in a rotationally fixed and axially immovable manner.

In the drill chuck described in the solution from EP 0 710 518 A2, there is a divided threaded ring that is placed in a circumferential groove in the chuck body, and is secured there by means of a pressed-on intermediate sleeve. While the customary assembly of the drill chuck can take place from the axial direction, the assembly of the divided threaded ring requires a working direction rotated by 90°, which has a disruptive effect in an automated assembly process. It is thus beneficial to use an undivided threaded ring and to provide the locking sleeve for axially securing it, which offers the additional advantage that the sleeve can carry the ring of locking recesses. Just as in the case of the formation of the ring of locking recesses on the thrust collar, it is no longer necessary to provide the chuck body with such a ring, while the locking sleeve offers the advantage over the thrust collar that the axial dimension of the ring can be considerably longer, thus achieving the desired reduced wear of the locking element. Wear in this design is no greater than in the design where the ring is formed directly on the axially forward section of the chuck body.

It is additionally preferred within the scope of the invention for the locking sleeve to have a cylindrical forward body section and a rear cone section that is provided for placement against an axially forward annular collar of the threaded ring.

The threaded ring can be fabricated with very high precision, although the use of the threaded ring requires it to be hardened, and this process leads to a slight deformation of the threaded ring. With the embodiment proposed by the invention, the locking sleeve not only achieves axial securing of the threaded ring, but also radial securing and centering of the threaded ring, so that hardening of the threaded ring is without detriment to the installed drill chuck.

Within the scope of the invention, it is not absolutely necessary for the cylindrical forward body section of the locking sleeve to carry the ring of locking recesses. It is thus preferred within the scope of the invention for the locking sleeve to have a center section, extending parallel to the chuck axis that carries the ring of locking recesses and is connected to the body section and the cone section by section edges extending parallel to the guide seats. This design of the locking sleeve results in a structure of the drill chuck that is more compact, in particular is shorter in the axial direction, since the center section can cover the exit openings of the guide seats in the chuck body without obstructing the clamping jaws because the section edges displace both the center section and the cone section radially outward out of the adjustment travel of the clamping jaws in the guide seats.

Provision is additionally made within the scope of the invention that the adjusting ring is implemented as an adjusting sleeve with a control cam located on the inner circumferential surface for the locking element, and that the adjusting sleeve is axially fixed with respect to the chuck body by a secondary retaining mechanism. Thus, it is not absolutely necessary for the adjusting sleeve to also be axially secured by means of the adjusting sleeve, since this could lead to unacceptable inaccuracies in the tolerance chain.

It is also possible, however, for the secondary retaining mechanism to have a retaining ring that engages an annular groove of the adjusting sleeve and is axially supported toward the front on an intermediate sleeve that is attached to the threaded ring in a rotationally fixed and axially immovable manner. In particular, this embodiment avoids the need for a retaining ring at the axially forward end of the chuck body, which has a braking effect on a rotatable protective cap located on the chuck body, which cap can, in this embodiment, be rotatably supported on the adjusting sleeve. The rotatable protective cap prevents stress on the locking device when a workpiece is drilled through and the drill chuck subsequently strikes the surface.

It is also beneficial for the adjusting sleeve to have a radial sleeve shoulder for radial contact with the metallic intermediate sleeve, since improved radial guidance of the adjusting sleeve can be achieved in this way.

Improved axial retention, in particular of the locking sleeve relative to the chuck body, can be achieved in that the chuck body has a circumferential groove in the region covered by the forward section of the body, into which groove a bead of the forward section of the body of the locking sleeve is crimped.

The invention additionally relates to a method for producing a locking sleeve for an above-described drill chuck, wherein, according to this method, an annular metal plate having a central opening is deep-drawn by means of a male die. As an additional step of the method, it is possible for the locking teeth to be formed during the deep-drawing with a male die that presses the metal plate into a cup with a suitable circumferential structure. Alternatively, it is possible for the locking teeth to be formed on the outer surface of the locking sleeve by means of a knurling wheel after the deep-drawing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
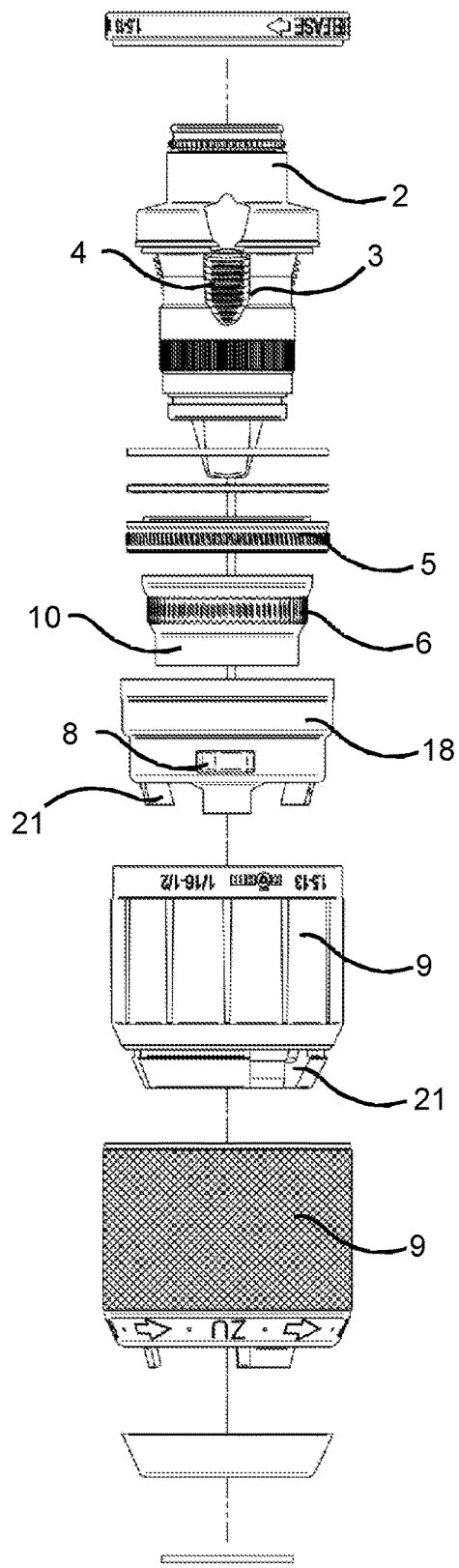
FIG. 1 is an exploded view of a drill chuck according to an embodiment of the invention.
Figure 2:
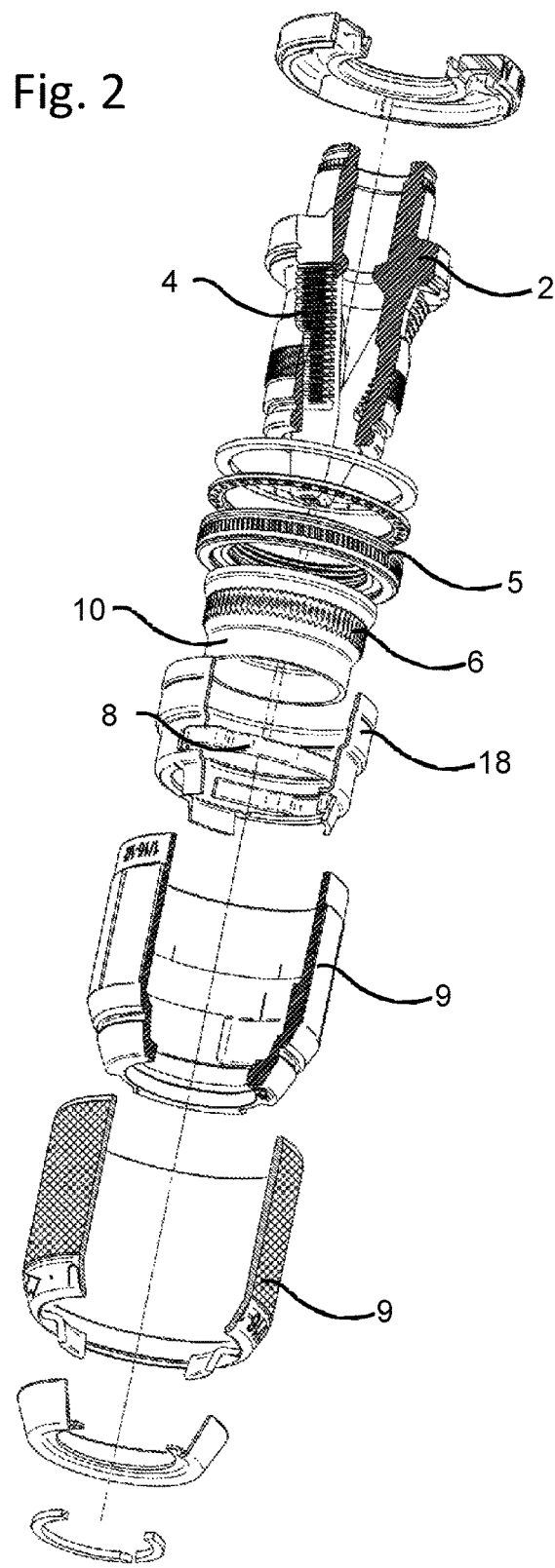
FIG. 2 is an exploded, perspective view, shown in partial cross-section.
Figure 3:
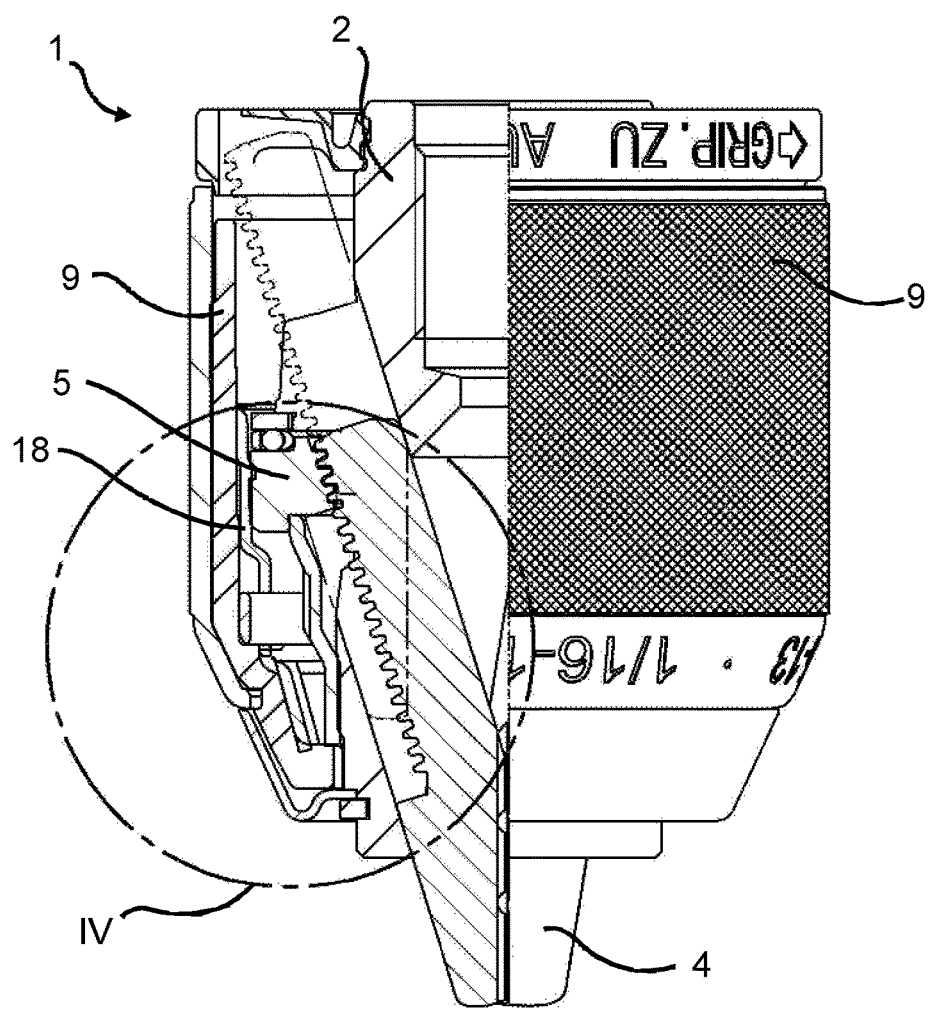
FIG. 3 is a side view of the drill chuck from FIG. 1; shown as a longitudinal section on the left-hand side.
Figure 4:
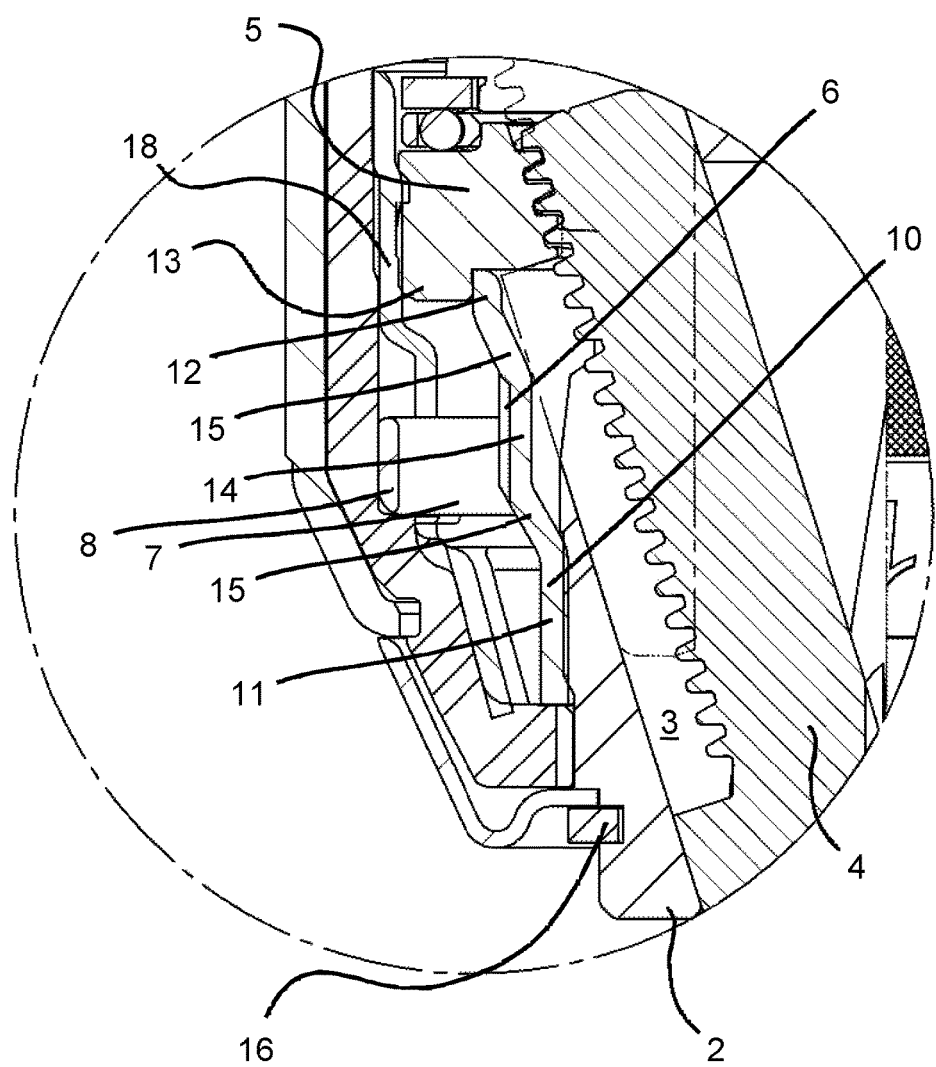
FIG. 4 shows the detail IV from FIG. 3.
Figure 5:
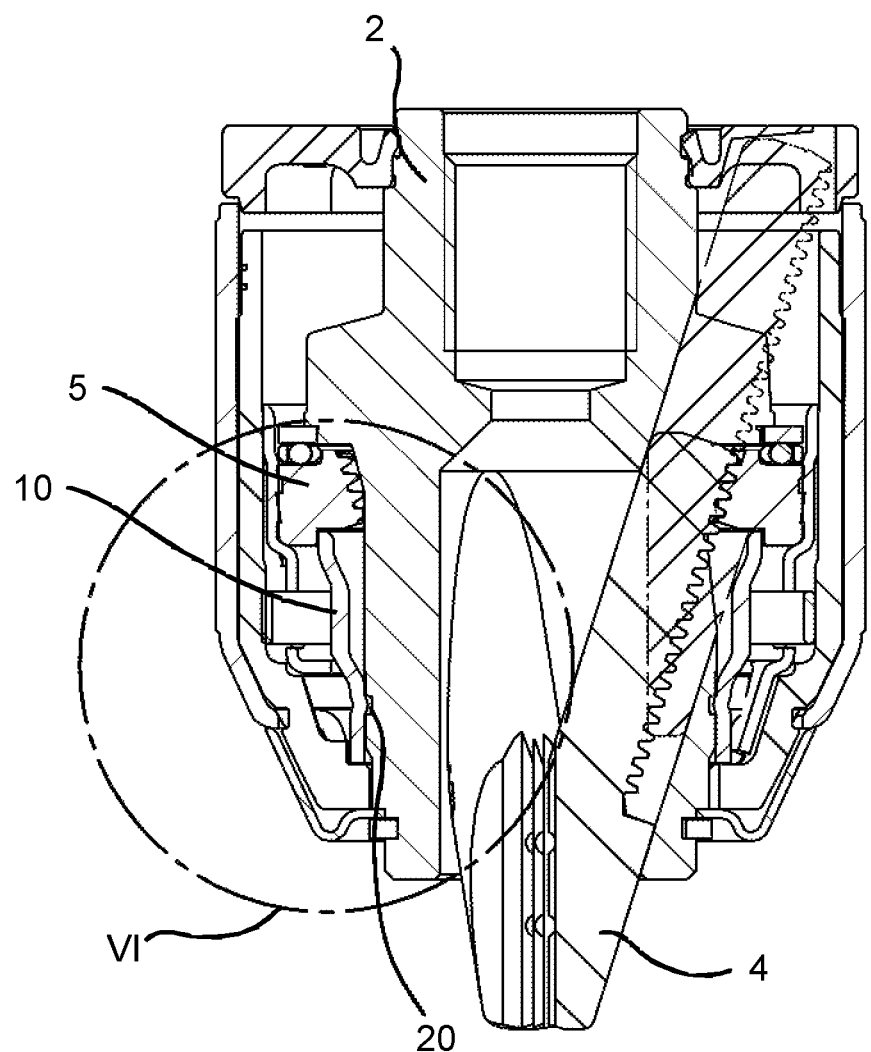
FIG. 5 is a longitudinal section through another embodiment.

In the drawings, a first embodiment of a drill chuck 1 according to the invention is shown in an exploded view in FIGS. 1 and 2. It is evident therefrom that the drill chuck 1 has a chuck body 2 that can be connected to a drilling spindle, in which body are arranged clamping jaws 4 in guide seats 3 extending at an angle to the chuck axis, which jaws are movable for opening and closing by means of a threaded ring 5 that is arranged to be rotatable and axially immovable relative to the chuck body 2. The rotational position of the threaded ring 5 can be fixed in order to present unwanted displacements of the clamping jaws 4. This purpose is served by a locking device that is formed between the threaded ring 5 and the chuck body 2 and includes a coaxial ring 6 of locking recesses on the side of the chuck body 2 and at least one locking element 7 on the side of the threaded ring 5 that engages the locking recesses with the force of a locking spring 8. In this design, the locking element 7 and the locking recesses that receive it make contact at flank surfaces inclined relative to one another such that they lock the threaded ring 5 against rotation in the direction corresponding to opening of the drill chuck 1, but when the threaded ring 5 is rotated by hand in the opposite direction with sufficient torque, which is to say corresponding to closing of the drill chuck 1, they allow the locking element 7 to be pushed out of the locking recesses in opposition to the spring force and to slide along the circumference of the chuck body 2. The locking element 7 can be displaced between its states engaged with and disengaged from the locking recesses, to which end the locking element 7 can be displaced by a control cam on a coaxial and likewise axially immovable adjusting sleeve 9, and the adjusting sleeve 9 can be suitably rotated relative to the threaded ring 5. This rotation of the adjusting sleeve 9 relative to the threaded ring 5 is limited in both directions of rotation in a positive-locking manner by stops. Rotating the adjusting sleeve 9 in the direction corresponding to closing of the drill chuck 1 moves the locking element 7 from the disengaged state to the engaged state, and the reverse is also true. A detent device is provided between the adjusting sleeve 9 and the threaded ring 5, and has two detent positions in the circumferential direction, wherein the locking element 7 is engaged with the locking recesses in one detent position, and is in the disengaged state in the other detent position. The method of operation of a locking device of this type has long been known to the technical community from EP 0 710 518 A2.

In the embodiments of the invention shown in the drawings, the threaded ring 5 is implemented as an undivided threaded ring with an opening width that is larger than the diameter of the axially forward section of the chuck body 2, wherein a locking sleeve 10 that carries the ring 6 of locking recesses and serves to axially secure the threaded ring 5 is attached to the axially forward section of the chuck body 2 in a rotationally fixed and axially immovable manner.

The locking sleeve 10 itself has a cylindrical forward body section 11 and a rear cone section 12 that is provided for placement against an axially forward annular collar 13 of the threaded ring 5. In addition, the locking sleeve 10 has a center section 14, extending parallel to the chuck axis, that carries the ring of locking recesses and is connected to the forward body section 11 and the cone section 12 by section edges 15 extending parallel to the guide seats 3.

The adjusting sleeve 9 is axially fixed relative to the chuck body 2 by means of a secondary retaining mechanism, wherein the secondary retaining mechanism in the embodiments shown in FIGS. 1 to 6 is a retaining ring 16 positioned in the axially forward region of the chuck body 2. In the embodiments from FIGS. 7 to 10, the retaining ring 16 engages an annular groove 17 of the adjusting sleeve 9 and is axially supported toward the front on the intermediate sleeve 18 that is attached to the threaded ring 5 in a rotationally fixed and axially immovable manner.

Figure 7:
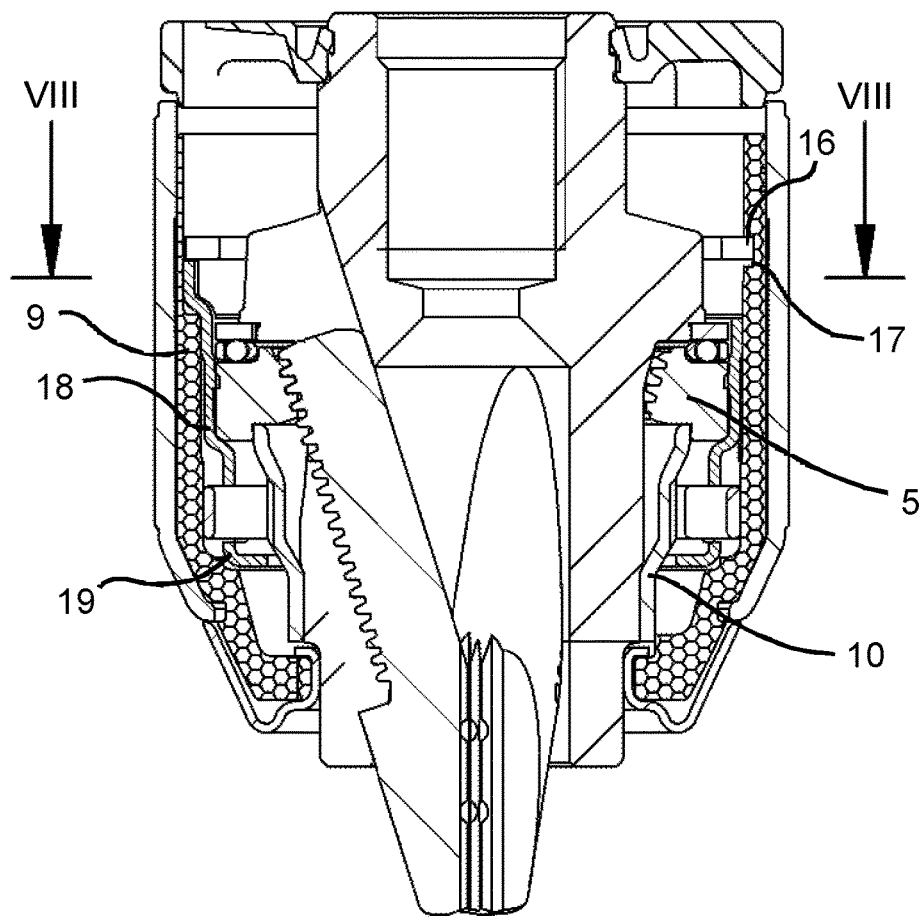
FIG. 7 is a longitudinal section through another embodiment of the invention.
Figure 8:
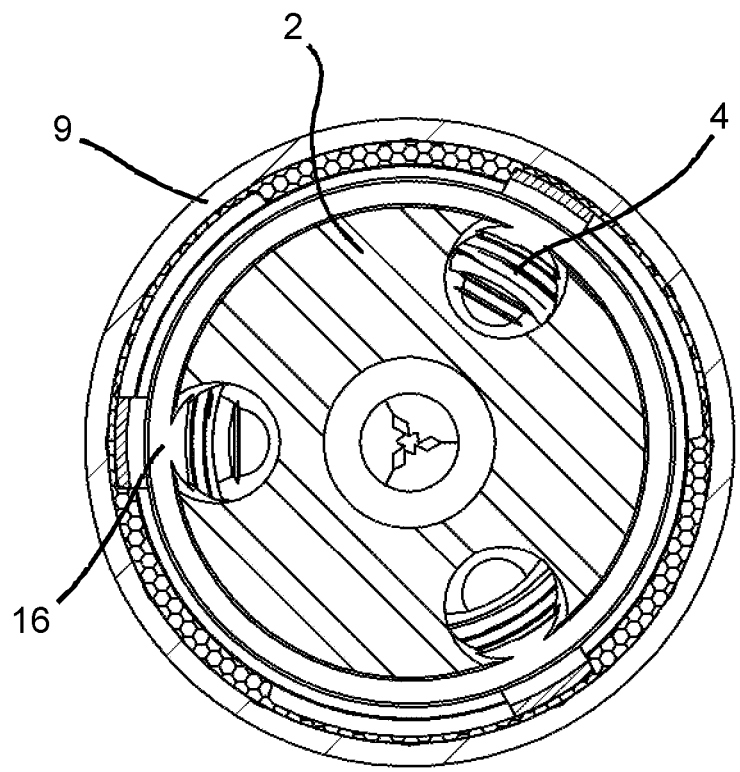
FIG. 8 shows the section VIII-VIII from FIG. 7.
Figure 9:
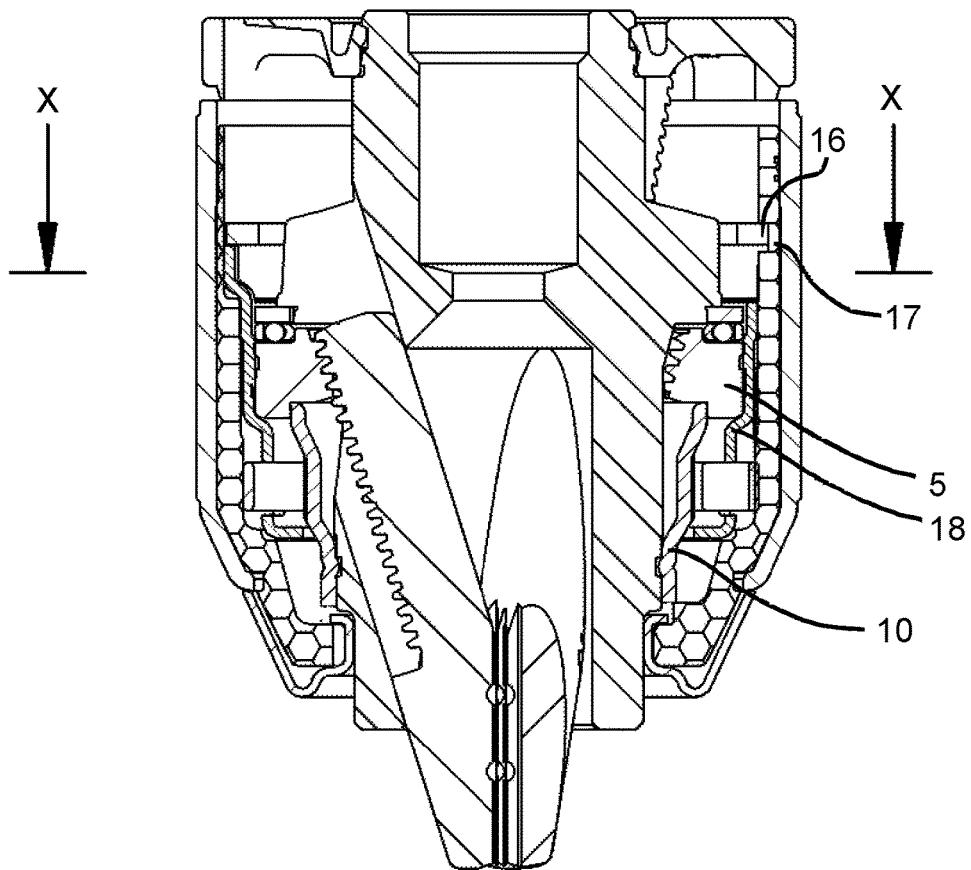
FIG. 9 is another embodiment in a longitudinal section.
Figure 10:
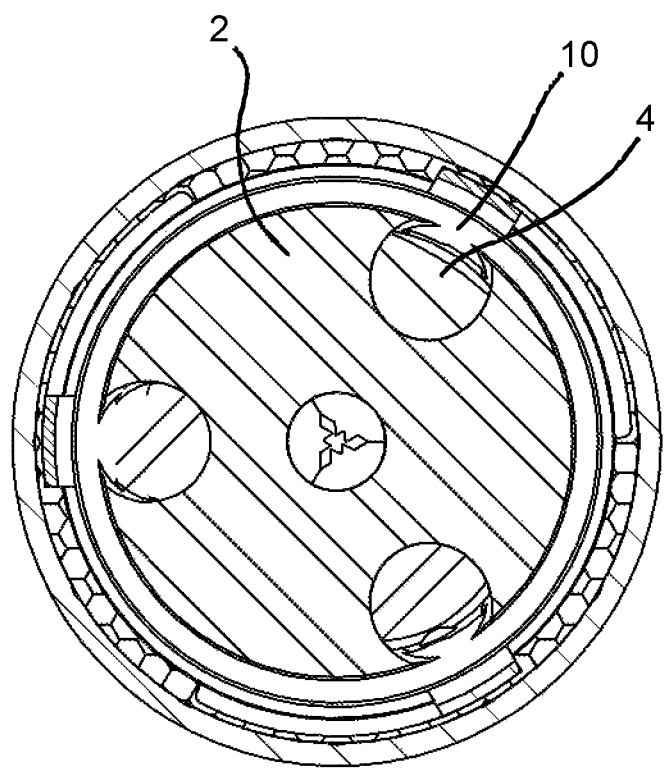
FIG. 10 shows the section X-X from FIG. 9.

It is also evident from FIGS. 7 and 9 that the adjusting sleeve 9 has a radial sleeve shoulder 19 for radial contact with the metallic intermediate sleeve 18.

Figure 6:
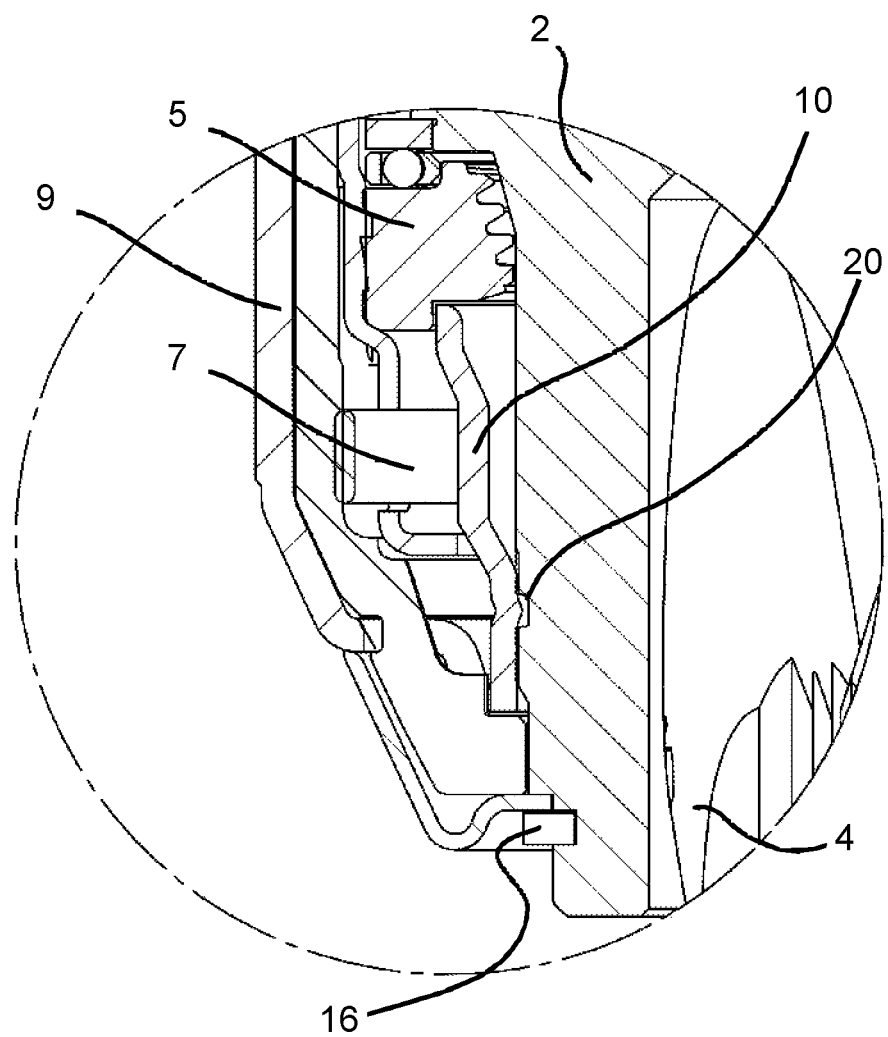
FIG. 6 shows the detail VI from FIG. 5.

FIGS. 6 and 9 also show that the chuck body 2 has a circumferential groove 20 in the region covered by the forward section of the body of the locking sleeve, into which groove a bead of the forward body section 11 is crimped.

The special feature of the locking sleeve 10 according to the invention is that it is not absolutely necessary for the sleeve to be manufactured and provided with locking teeth by turning and machining. It is possible for an annular metal plate having a central opening to be deep-drawn by means of a male die, wherein the locking teeth are formed during the deep-drawing by means of a male die that presses the metal plate into a cup with a suitable circumferential structure. The wall of the cup thus defines the length and shape of the individual sections of the locking sleeve.

Alternatively, it is also possible for the locking teeth to be formed on the outer surface of the locking sleeve 10 by means of a knurling wheel after the deep-drawing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drill chuck comprising:
 a chuck body connectable to a drilling spindle, the chuck body being arranged with clamping jaws in guide seats extending at an angle towards the chuck axis, the clamping jaws being movable for opening and closing via a threaded ring that is arranged to be rotatable and axially immovable relative to the chuck body;
 a locking device having a coaxial ring of locking recesses;
 at least one locking element that is engaged in the locking recesses under the force of a locking spring;
 an adjusting ring adapted to be rotated to a limited extent between stops, the rotation of which adjusts the locking element; and
 a detent device creating two detent positions in a circumferential direction,
 wherein the threaded ring is an undivided threaded ring with an opening width that is larger than a diameter of an axially forward section of the chuck body, and
 wherein a locking sleeve, which carries the ring of the locking recesses and axially secures the threaded ring, is attached to the axially forward section of the chuck body in a rotationally fixed and axially immovable manner,
 wherein the locking sleeve comprises:
  a cylindrical forward body section;
  a rear cone section that is provided for placement against an axially forward annular collar of the threaded ring; and
  a center section extending parallel to the chuck axis and carries the ring of the locking recesses and is connected to the forward body section and the cone section by section edges extending substantially parallel to the guide seats.

2. The drill chuck according to claim 1, wherein the adjusting ring is an adjusting sleeve with a control cam located on an inner circumferential surface for the locking element, and
 wherein the adjusting sleeve is axially fixed with respect to the chuck body by a secondary retaining mechanism.

3. The drill chuck according to claim 2, wherein the secondary retaining mechanism has a retaining ring that engages an annular groove of the adjusting sleeve and is axially supported toward a front portion on an intermediate sleeve that is attached to the threaded ring in a rotationally fixed and axially immovable manner.

4. The drill chuck according to claim 3, wherein the adjusting sleeve has a radial sleeve shoulder for radial contact with the metallic intermediate sleeve.

5. The drill chuck according to claim 1, wherein the chuck body has a circumferential groove in a region covered by the forward body section into which groove a bead of the forward body section is crimped.

6. A method for producing a locking sleeve for a drill chuck according to claim 1, wherein an annular metal plate having a central opening is deep-drawn via a male die.

7. The method according to claim 6, wherein the locking teeth are formed during the deep-drawing with a male die that presses the metal plate into a cup with a suitable circumferential structure.

8. The method according to claim 6, wherein the locking teeth are formed on the outer surface of the locking sleeve by a knurling wheel after the deep-drawing.

* * * * *